US011684993B2

(12) United States Patent
Nolfi et al.

(10) Patent No.: US 11,684,993 B2
(45) Date of Patent: Jun. 27, 2023

(54) REUSABLE, GAS PERMEABLE PURGE SYSTEM FOR WELDING APPLICATIONS

(71) Applicant: ADVANCED F.M.E. PRODUCTS, INC., Mentor, OH (US)

(72) Inventors: Thomas J. Nolfi, Chardon, OH (US); Chase Penix, Painesville, OH (US)

(73) Assignee: ADVANCED F.M.E. PRODUCTS, INC., Mentor, OH (US)

( * ) Notice: Subject to any disclaimer, the term of this patent is extended or adjusted under 35 U.S.C. 154(b) by 377 days.

(21) Appl. No.: 16/891,304

(22) Filed: Jun. 3, 2020

(65) Prior Publication Data

US 2020/0398366 A1 Dec. 24, 2020

Related U.S. Application Data

(60) Provisional application No. 62/865,521, filed on Jun. 24, 2019.

(51) Int. Cl.
*B23K 9/32* (2006.01)
*B23K 9/16* (2006.01)
*B23K 101/06* (2006.01)

(52) U.S. Cl.
CPC .............. *B23K 9/326* (2013.01); *B23K 9/164* (2013.01); *B23K 2101/06* (2018.08)

(58) Field of Classification Search
CPC ..... B23K 9/326; B23K 9/164; B23K 2101/06
USPC ........................................................ 228/219
See application file for complete search history.

(56) References Cited

U.S. PATENT DOCUMENTS

| | | | |
|---|---|---|---|
| 5,100,043 A | * | 3/1992 | Hallenbeck ............ B23K 9/326 228/42 |
| 5,785,235 A | | 7/1998 | Beatty |
| 7,112,358 B1 | | 9/2006 | Hacikyan |
| 8,376,208 B1 | | 2/2013 | McCarthy et al. |
| 8,540,137 B1 | | 9/2013 | Hacikyan |
| 8,616,432 B1 | | 12/2013 | Hacikyan |
| 8,647,731 B2 | | 2/2014 | Hacikyan |
| 9,296,060 B2 | | 3/2016 | Hacikyan |
| 10,160,067 B2 | * | 12/2018 | Nelli ........................ G01K 1/14 |
| 2013/0284297 A1 | * | 10/2013 | Hacikyan ............... B23K 9/326 138/93 |
| 2017/0173723 A1 | * | 6/2017 | Evans ....................... B23K 9/16 |
| 2017/0225258 A1 | * | 8/2017 | Hacikyan ............... B23K 9/326 |

FOREIGN PATENT DOCUMENTS

| | | | | |
|---|---|---|---|---|
| GB | 2201623 A | * | 9/1988 | ............ B23K 9/326 |
| GB | 2288562 A | * | 10/1995 | ............ B23K 9/325 |
| KR | 20120004547 U | * | 6/2012 | ............ B23K 9/325 |
| KR | 101263282 B1 | | 5/2013 | |
| KR | 20180003000 U | | 10/2018 | |

* cited by examiner

*Primary Examiner* — Marrit Eyassu
(74) *Attorney, Agent, or Firm* — Hudak, Shunk & Farine Co. LPA (57) ABSTRACT

A purge system useful in welding applications to provide a shielding or purging gas to a weld site, preferably of a tube, pipe or construction, while also providing controlled release of an exhaust gas and pressure relief through the use of a permeable body. The purge system is also flame resistant allowing use in close proximity to the weld site. The design facilitates ease of insertion, holding and retraction in a tube, pipe or other construction.

19 Claims, 6 Drawing Sheets

Fig. 1

REUSABLE, GAS PERMEABLE PURGE SYSTEM FOR WELDING APPLICATIONS

FIELD OF THE INVENTION

The present invention relates to a purge system useful in welding applications to provide a shielding or purging gas to a weld site, preferably of one or more tubes or pipes, while also providing controlled release of an exhaust gas and pressure relief through the use of a permeable body. The purge system is also flame resistant allowing use in close proximity to the weld site. The design facilitates ease of insertion, holding and retraction in a tube, pipe or other construction.

BACKGROUND OF THE INVENTION

During the welding of tubes, pipes or other constructions, it is often desirable or even required to purge or remove oxygen within the tube, pipe or construction to shield the weld site from oxygen to prevent one or more of oxidation or atmospheric contamination, corrosion or other degradation from occurring within the weld.

The weld site is typically shielded or purged with an inert gas such as argon or a mixture of helium and argon. As purging gases are costly, it is desirable to provide containment devices so that the use of the volume of purging gas utilized is reduced.

There are many different types of purge dams or containment devices known in the art including, but not limited to, purge paper, purge film, purge plugs, purge bladders, purge baffles and flange purgers.

Purge papers are generally water-soluble and can be flushed out of a system with water or steam after welding is complete. Papers can be obtained as sheets, rolls and pressure-sensitive tape with adhesive that can dissolve with the paper.

Purge films are similar to purge paper and can be cut to fit a desirable opening in a tube or pipe.

Purge plugs or blocks are available for sealing off one section of a pipe from another and can include gas supply ports, see for example U.S. Pat. No. 5,785,235.

Purge bladders and baffles include air chambers that can be inflated to create a seal near a weld zone.

A flange purger uses an aluminum cone, which covers a range of tube sizes and is connected in some embodiments to a single-ended tube purge baffle with a gas diffuser.

Examples of known purge gas containment devices and purge dams are disclosed for example U.S. Pat. Nos. 9,296,060, 8,647,731, 8,616,432, 8,540,137, 8,376,208, 7,112,358, 5,785,235, 2017/0173723 and Korean Patent Nos. KR101263282 and KR20180003000.

In view of the above, there is still a need in the art for reusable, gas permeable purge systems for welding applications that are adapted to provide a shielding or purging gas to a weld site while also providing controlled release of an exhaust gas and pressure relief.

SUMMARY OF THE INVENTION

The problems noted above and others are solved by the purge system of the present invention which is easy to use and provides rapid, reliable sealing of tubes and pipes to be welded, a purge valve for supplying shielding or purging gas to a weld site and venting of an exhaust gas to prevent buildup of pressure within a containment area.

The purge system includes a three-dimensional body that is compressible and sufficiently resilient to re-expand, which allows the purge system to be compressed and inserted into a tube, pipe or other construction, whereby the re-expansion allows the body to sealingly engage with the inner wall of the tube, pipe or construction and hold itself in place while a welding operation is performed. Thereafter, the purge system can be retracted from the tube or pipe and reused.

In a further embodiment, the components of the purge system are flame retardant or flame resistant, which is critical when the welding system is utilized near a weld site.

In yet another embodiment of the invention, the purge system is manufactured from materials that contain low levels of halogens, and particularly have less than 350 ppm total halogen content. This allows the purge system to be utilized without damaging various tubes or pipes, such as when formed from stainless steel and other high performance piping metals.

In addition, in a further embodiment, the purge system is constructed from materials that can withstand relatively high temperatures, for example at least 100° C. (212° F.) and more preferably at least 175° C. (350° F.).

In still another embodiment, the body of the purge system is permeable due to the presence of pores which allow an exhaust gas to travel through the body between a first end and a second end. Due to the presence of the body pores, the body and purge system are thus free of any other exhaust holes. The porous body allows exhaust gas to be transmitted from one side of the body to the other and prevents buildup of pressure that could otherwise rupture a non-breathing device.

The purge system in a further embodiment is provided with one or more sensors that provide feedback to a user and can measure for example temperature and/or pressure at one or more sides or faces of the device.

In still another embodiment, the purge system includes a scaffold that is connected to both the purge valve and the body which maintains the purge valve in a fixed position in the purge system and allows for reliable, repeated connection to a purge gas source. The scaffold includes a post extending through the body between the first end and the second end and bases connected to opposite ends of the post, the bases comprising a flange for preventing the body from being removed from the first end of the post. The base also includes a cap having an internal cavity in which a second of post is located. A latch is present in the internal cavity of cap that mates with a portion of the post and prevents the post from being withdrawn from the cap.

In still another embodiment, a lanyard is connected to the scaffold for withdrawing the purge system from a tube or pipe. In some embodiments, the lanyard is also operatively connected to the sensor and can transmit sensor data through the lanyard to a display device.

In a particularly preferred embodiment, a purge system for a welding application is disclosed, comprising a body having a three-dimensional shape, the body comprising one or more of a resilient and elastic material that allows the body to be compressed and re-expanded, the body having a length between a first end and second end, and a width perpendicular to the length, the body being porous such that an exhaust gas is able to travel through the body between the first end and the second end; and a purge valve system operatively connected to the body and including a purge valve having a first opening on the first side of the body and a second opening on the second side of the body for transporting a purging gas from the first side of the body to the second side, the purge valve having a fitting mateable with a fitting of a gas source, the purge system further including a scaffold connected to both of the purge valve and the body that operatively connects the purge valve to the body.

For the avoidance of doubt, it is to be understood that the purge system of the present invention can include one or more of each of the embodiments described herein. In some cases, it is desirable to provide a purge system with each of the embodiments presented herein and some other purge systems comprise less than all of the embodiments described.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "first end", "second end", "front", "back", "horizontal", "vertical", "up", "upper", "down", "lower", "top" and "bottom" as well as derivatives thereof (e.g., "horizontally", "downwardly", "upwardly", etc.) should be construed to refer to the orientation as then described or as shown in the drawing figure under discussion. These relative terms are for convenience of description and are not intended to require a particular orientation unless specifically stated as such. Terms including "inwardly" versus "outwardly", "longitudinal" versus "lateral" and the like are to be interpreted relative to one another or relative to an axis of elongation, or an axis or center of rotation, as appropriate. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 6:
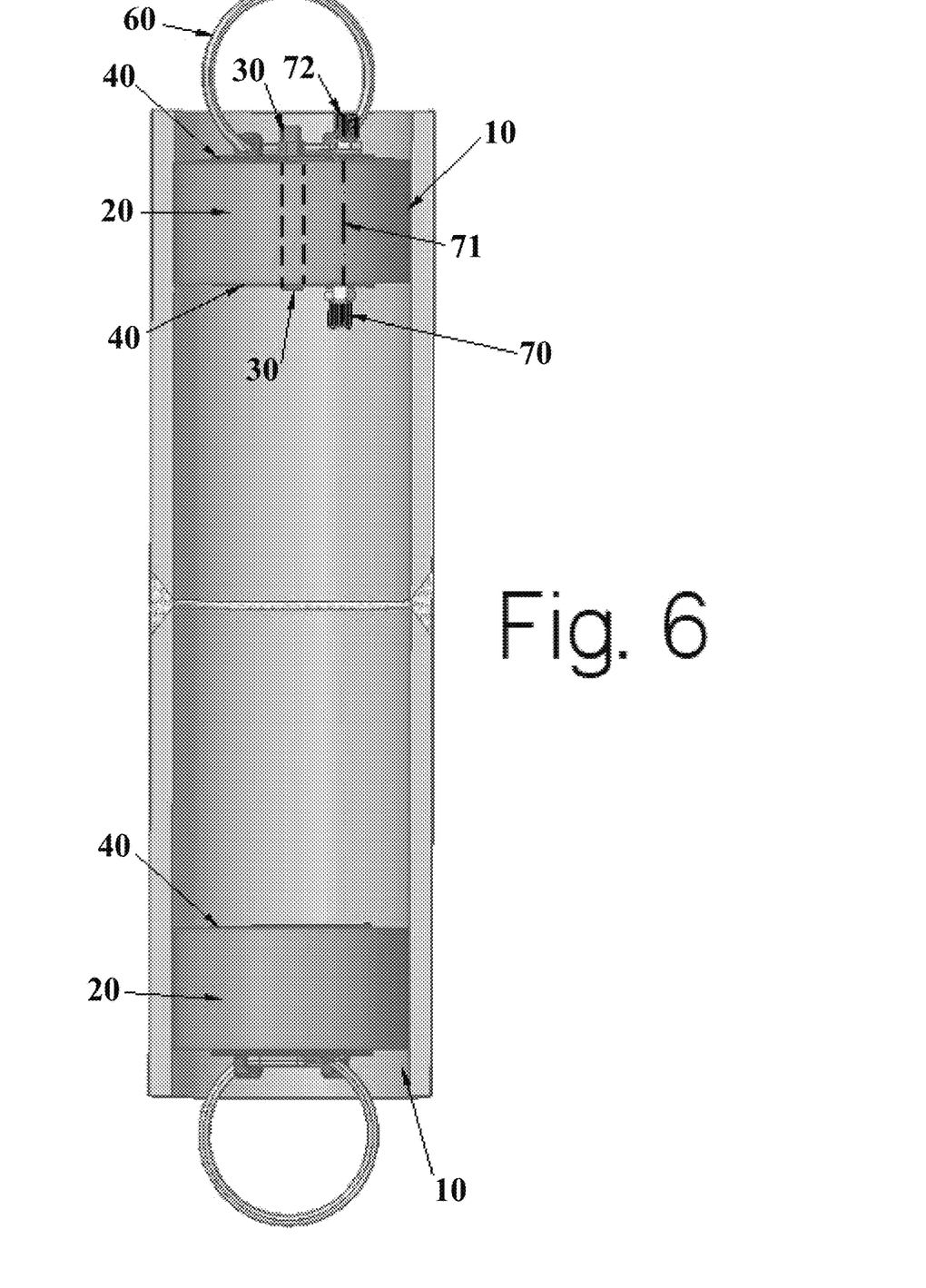
FIG. 6 is a partial cross-sectional view showing two pipes or tubes connected by welding, wherein one embodiment of the purge system of the present invention is positioned within one pipe so that the weld area can be purged of an exhaust gas while substantially sealing the tube to isolate the welding region.

The purge systems of the invention are useful in welding applications to assist with purging of an exhaust gas, such as ambient air which contains oxygen that is detrimental in certain welding operations, from a welding region located in a tube, pipe or the like. The purge system is designed to be used to substantially seal a portion of a tube, pipe or other construction to isolate the welding region, for example as illustrated in FIG. 6. The purge system also includes a purge valve that can be used to supply a shielding or purging gas to the welding region located in the tube, pipe or the like while also providing controlled release of an exhaust gas through a gas permeable body of the purge system. The body serves a further purpose of providing a self-supporting seal within the tubing or pipe due to the resiliency of the body, which can be compressed to facilitate insertion into the tubing or pipe and thereafter be allowed to re-expand against the inner walls of the tube or pipe, thereby sealingly engaging the side surfaces of the body with the inner walls.

Figure 1:
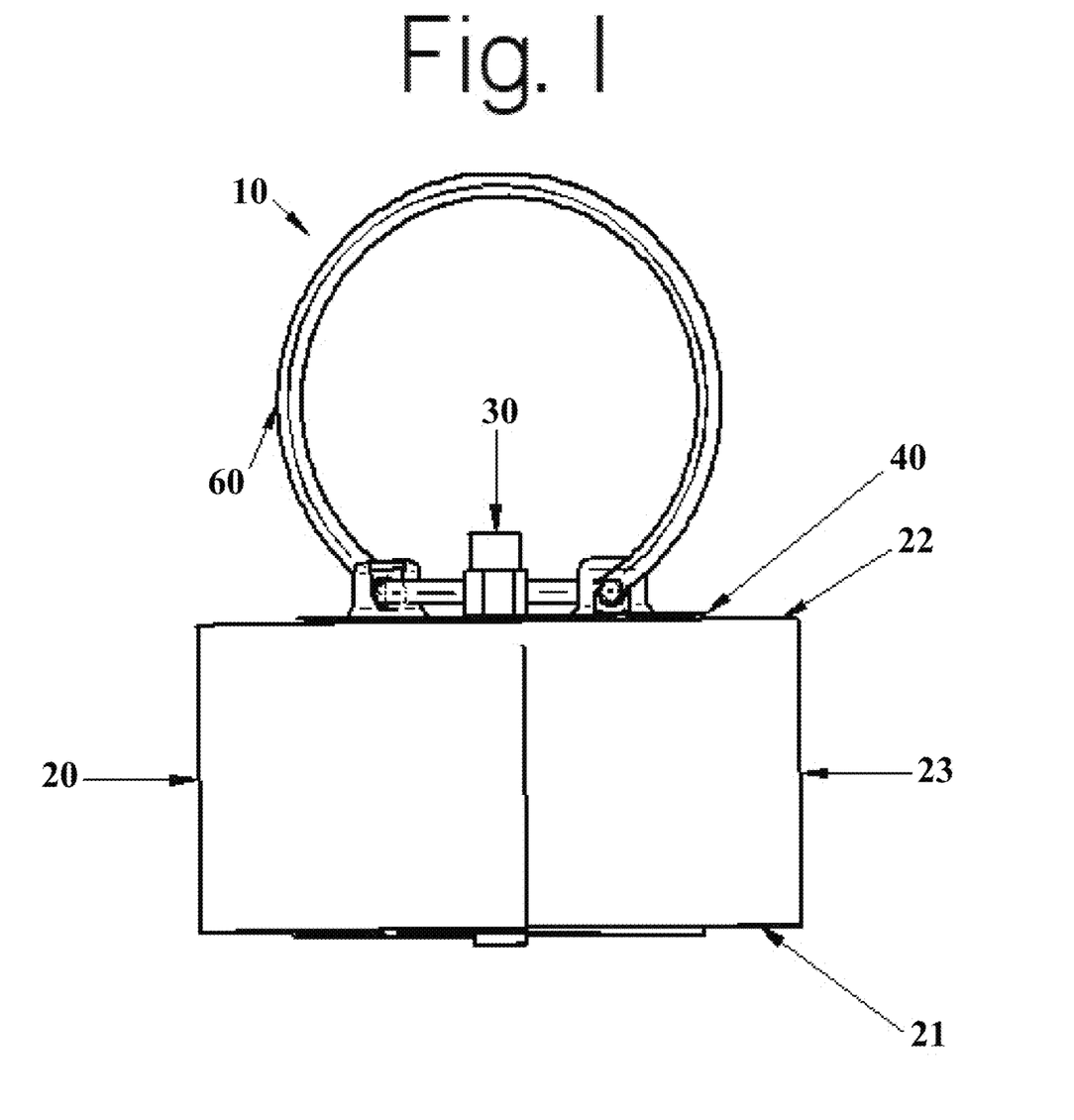
FIG. 1 is a side view of one embodiment of a purge system of the present invention.
Figure 2:
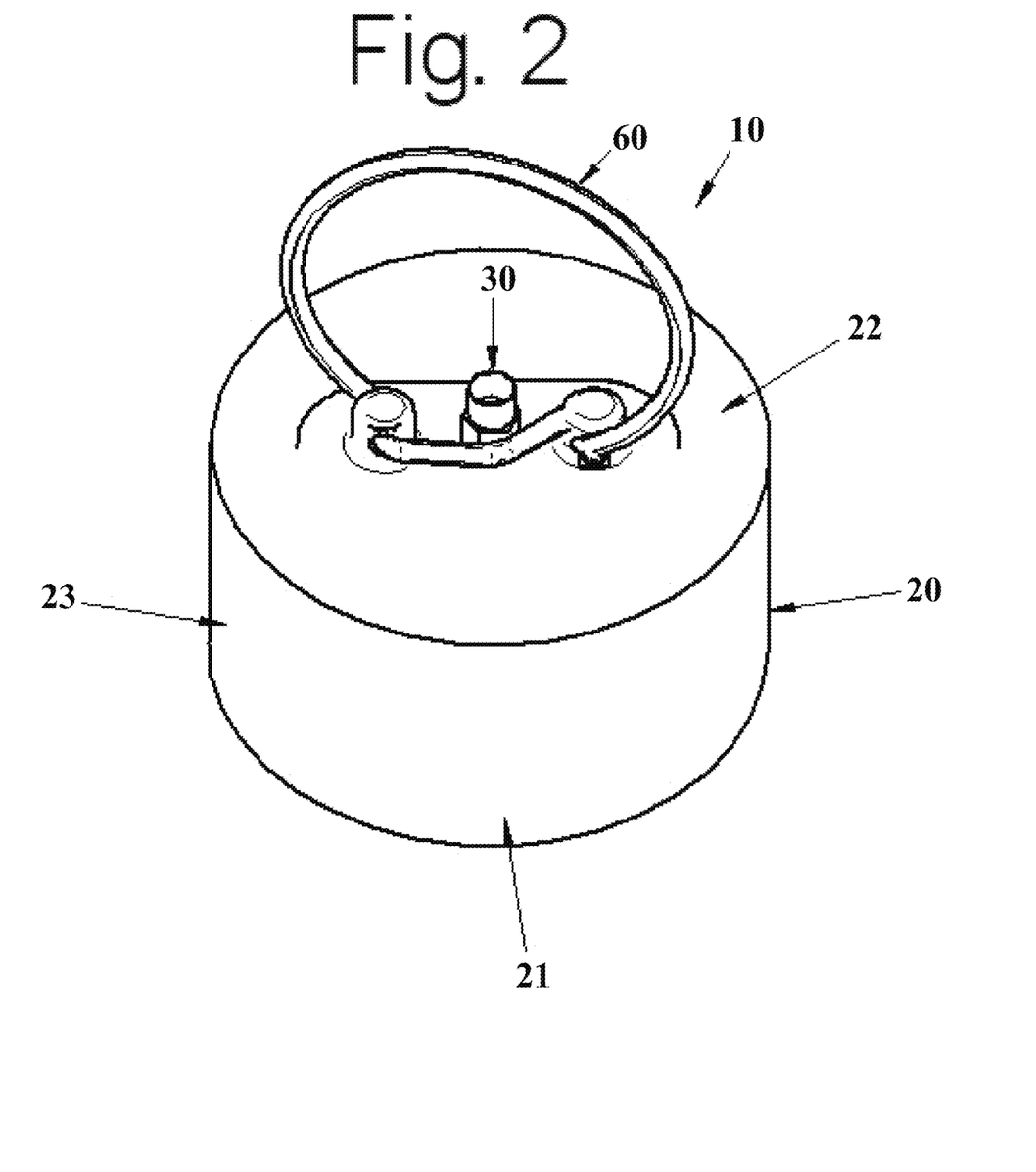
FIG. 2 is perspective view of the embodiment illustrated in FIG. 1.
Figure 3:
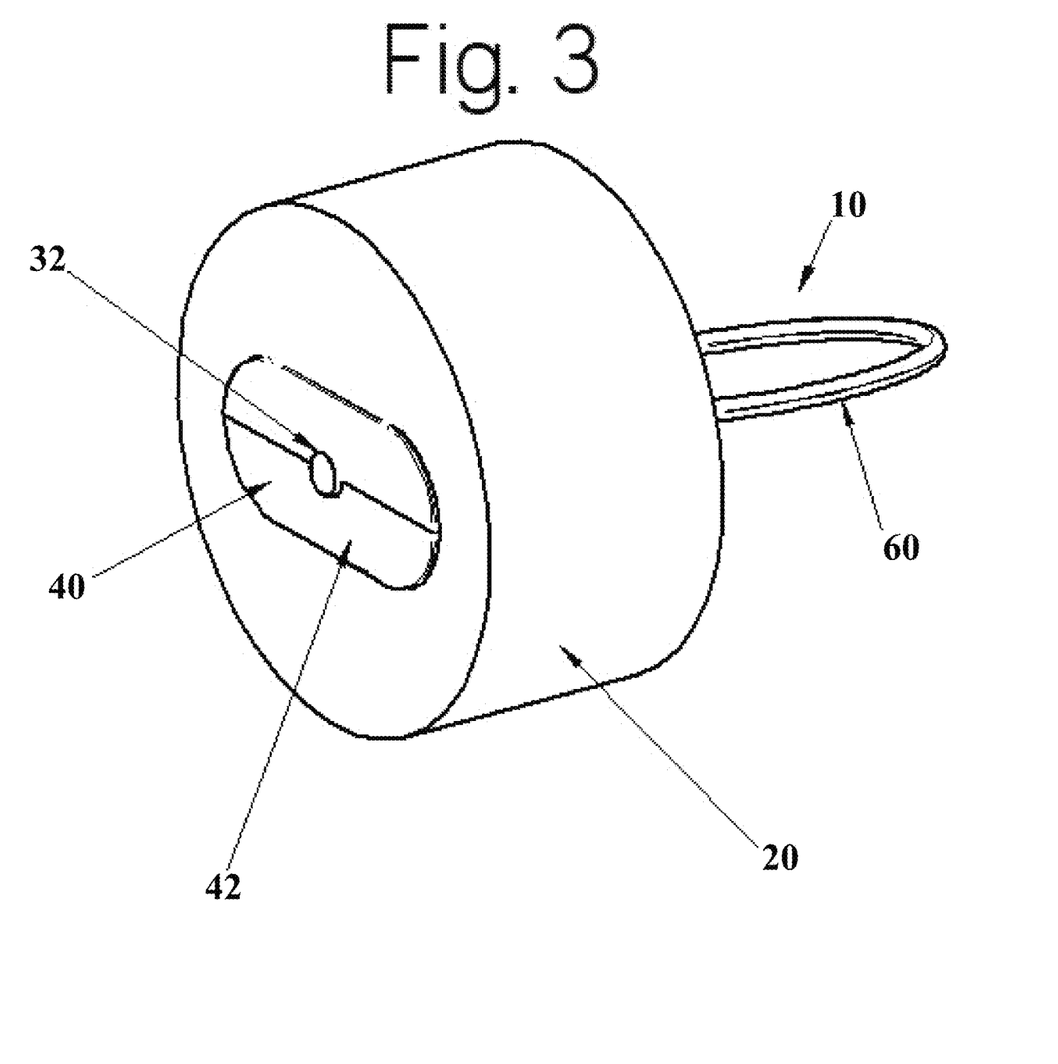
FIG. 3 is a bottom perspective view of the embodiment illustrated in FIG. 1.

Turning now to the drawings, FIGS. 1 to 3 illustrate one embodiment of a purge system 10. Purge system 10 generally includes a body 20, scaffold 40 which extends between a first end 21 and a second end 22 of the body, and a purge valve system 30 connected to scaffold 40. A multi-purpose lanyard 60 is also illustrated.

Body 20 comprises a flexible, compressible, and resilient material and preferably has a cylindrical or tubular form adapted to be inserted into a tube, pipe or similar construction. Body 20 can be compressed, generally radially before insertion into an orifice of a tube, pipe or other construction and there allowed to reexpand whereby a side surfacing 23 of body 20 contacts the inner wall of the tube, pipe or other construction, preferably with sufficient force to substantially prevent movement between body 20 and a tube, pipe or other construction. The material of body 20 is sufficiently resilient or rigid such that side surface 23 of body sealingly engages with one or more inner walls of the tube or pipe. In various embodiments, the body is of one piece construction.

Figure 4:
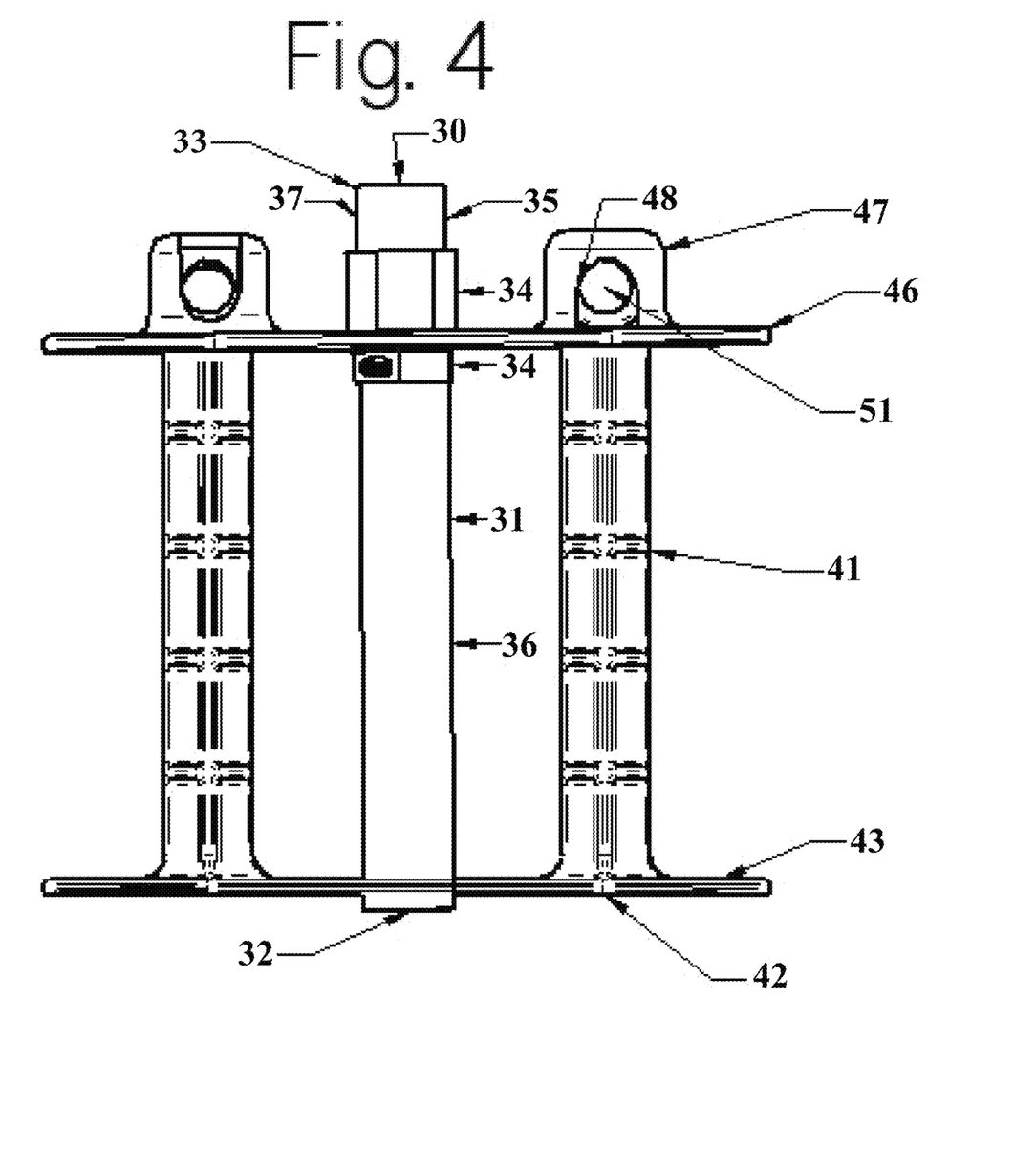
FIG. 4 is a side view of the purge system with the body removed to show the purge valve and scaffold.
Figure 5:
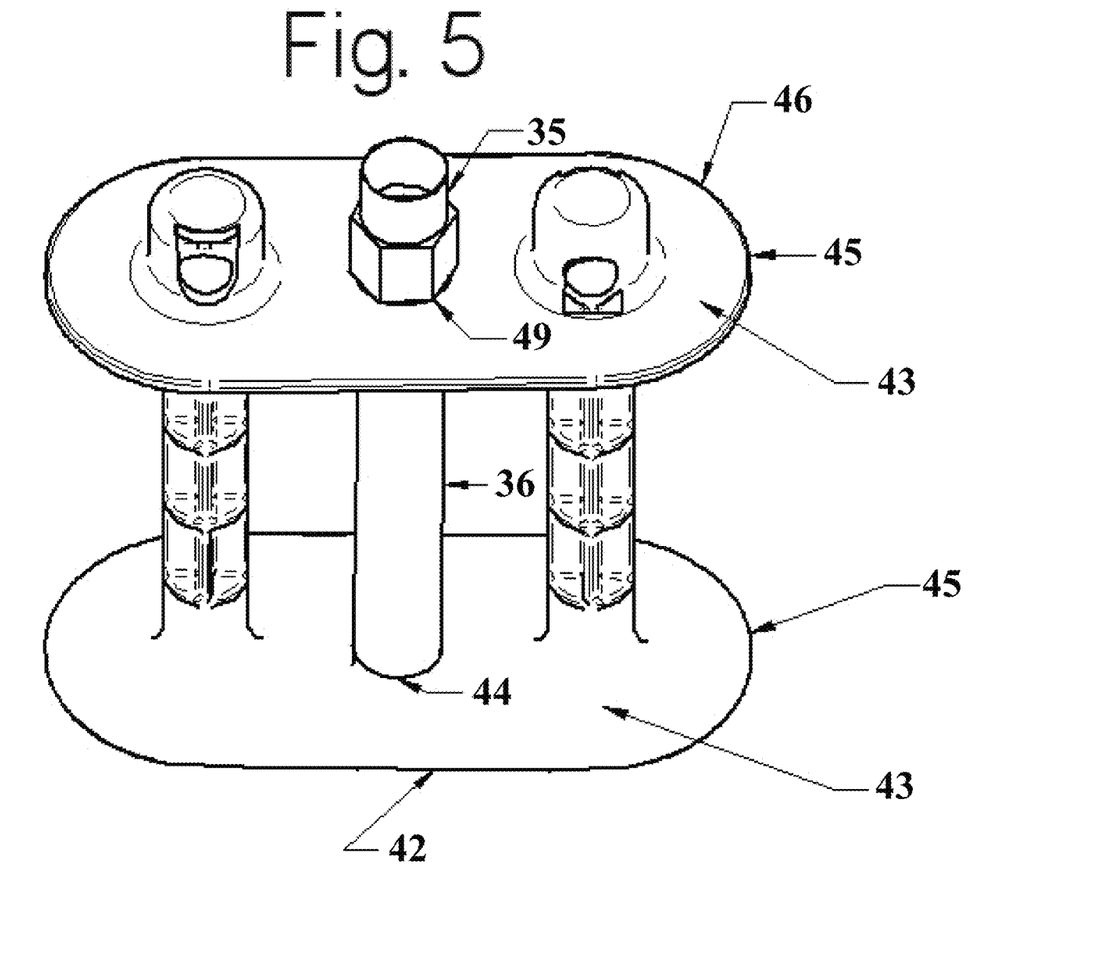
FIG. 5 is a top perspective view of the embodiment illustrated in FIG. 4.

Scaffold 40 has multiple functions in the purge system 10 of the present invention and is particularly illustrated in combination with the purge valve system 30 in FIGS. 4 and 5. Scaffold 40 maintains body 20 in a desired position with respect to purge valve system 30. Scaffold 40 also provides a means for attaching lanyard 60 to the purge system to facilitate placement of the purge system within a tube or pipe as well as allow removal therefrom. Scaffold 40 also holds purge valve system 30 at a particular orientation to facilitate transfer of a purging gas through the purge system, in particularly through body 20 from second end 22 to first end 21.

To accomplish the above noted goals, scaffold 40 includes one or more posts 41 that preferably extend in an axial direction in relation to body 20. Two posts are shown in FIGS. 4 and 5. A lower end of post 41 preferably integrally is connected to lower base 42. Base 42 has a flange 43 that extends outwardly from post 41, preferably a sufficient distance in order to prevent the body from being withdrawn or separated from post 41. In some embodiments, the flange 43 extends substantially perpendicular to axis of post 41. Base flange 43 extends outwardly from post 41 and forms a rim 45. The ultimate dimensions, such as width and thickness of base flange 43 generally depend upon the size of body 20 to be utilized in conjunction therewith. The design of the flange 43 depends on factors, such as size of the body, design of the purge valve system 30, composition of the body and constructions in which the purge system 10 will be utilized.

Lower base 42 includes a base aperture 44 that serves as a guide for various components of purge valve system 30. While the base aperture 44 is shown centrally located in FIG. 4, it is to be understood that the location thereof on the above can vary, depending upon the construction of purge valve system 30.

Scaffold 40 also includes upper base 46, preferably a one-piece construction, which is operatively connectable to an upper end of post 41. Upper base 46 also includes a base flange 43 can be the same size as or different from that of base flange 43 of lower base 42. Upper base 46 includes a cap 47 having a cap aperture 48 that extends through cap 47 from a first side to a second side, such as illustrated in the figures. Cap aperture 48 can be positioned coaxial to post aperture 51 as illustrated in FIG. 4, which facilitates locking of upper base 46 to post 41 through a suitable fastener. In various embodiments, a retrieval aid such as lanyard 60 as illustrated in FIG. 1 can be inserted through coaxial cap aperture 48 and post aperture 51 which serves to secure upper base 46 to post 41 and also be utilized to move or remove the purge system from a construction after use or as desired. Base flange 43 of upper base 46 extends outwardly from cap 47 in a manner similar to that of base flange 43 with respect to lower base 42, preferably in a direction perpendicular to the axial direction of post 41 in some embodiments. The outer perimeter of upper base 46 also has a rim 45 which can be the same or different as rim 45 of lower base 42. Upper base 46 also includes a valve aperture 49 that facilitates connection of purge valve system 30 to upper base 46. In a preferred embodiment, the purge valve system 30 is fixed to upper base 46.

Purge valve system 30 transfers a purge gas to a weld site from the second end 22 of body 20 to the first end 21 utilizing purge valve 31, which is generally a conduit that extends through both body 20 and scaffold 40. A purge gas passes through second opening 33 and exists the purge valve system 30 through first opening 32 into a cavity of a tube, pipe or other construction.

Purge valve 31 includes first segment 35 and second segment 36 that are generally an inlet segment and outlet segment, respectively. First segment 35 comprises a fitting 37 mateable with the fitting of a gas source. Second segment 36 includes first opening 32. First segment 35 and second segment 36 can be connected in any suitable manner. The segments 36 and 35 are preferably threadedly connected utilizing a suitable fastener 34. The purge valve 31 is fixedly connected to upper base 46 by extending a portion of one or more first segment 35 and second segment 36 through cap aperture 48 and securing the segments with fastener 34 thereby fixedly connecting the purge valve 31 to upper base 46. As illustrated in FIG. 4, one part of fastener 34 is located on one side of upper base 46 and another part of fastener 34 is located on a second side.

As also illustrated in at least FIGS. 1 and 4, the purge valve second segment 36 extends through base aperture 44 of lower base 42.

The length of purge valve 31 can vary depending upon the requirements of the end user. First opening 32 can be placed relatively close to first end 21 of body or extend further away therefrom in order to supply purge gas to a desired area of a welding operation.

The purge valve system 30 can be formed from any suitable materials. In a particularly preferred embodiment, the purge valve 31 comprises metal, preferably brass, which provides a durable connection to the purge gas source. Fitting 37 of purge valve 31 preferably comprises threads.

Scaffold 40 is preferably formed from a polymeric material, for example by injection molding of various components thereof. Other materials can be utilized in different embodiments. Polymers include one or more of homopolymers, copolymers and block copolymers. The type of polymer can vary depending on factors including the type of construction with which the purge system will be utilized. In one embodiment the preferred polymer for the scaffold is Nylon 6,6.

The composition of body 20 of purge system 10 is such that the body is porous and allows an exhaust gas to travel through the body between the first end and the second end. In addition, the body must be elastic or resilient in nature so that it can be compressed to fit into a desired opening, and yet reexpand to provide a snug fit within or about the opening. The resiliency of the body allows the purge system 10 to hold itself in place in a predetermined location or orifice.

The actual dimensions, i.e. the length, width and thickness of the body will vary depending upon the size and shape of the orifice, tube, opening, etc., in which the purge system 10 is to be secured. Thus, the body is not limited to one specific geometric shape or size such as a cylinder, cube, block or the like, but is custom tailored or profile fit to the dimensions of a particular inner surface of a tube, pipe or other construction. However, preferred bodies are substantially cylindrical or block shaped.

Body 20 is generally formed from a polymer or rubber and is preferably a foam or foam-like material. Regardless of body composition, as noted above, the body is porous to the extent that an exhaust gas is able to travel indirectly through the body between the first end and the second end. The body is free of an added vent, in particular a linear vent, other than the pores which allow the exhaust gas to filter through a body in a non-linear manner.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polycarbonates, polyurethanes, and polystyrene resins.

The body comprises less than or equal to 350 ppm of a halogen in preferred embodiments.

Optionally, but preferably, a flame retardant, resistant or quenching coating or covering applied to one or more sides of the body, with the coating or covering also being porous. The flame retardant coating applied to the side of the body facing the area to be welded in one embodiment. The flame retardant coating or covering is preferably applied to an area which is an area of the purge system 10 which can be exposed to high temperature debris, chips, filings, etc., such as from a welding process on a tube, pipe or other construction.

Various coatings are well-known in the art and are generally latexes such as HCF from PDI, Inc. of Circle Pines, Minn. Coverings of the present invention include, but are not limited to, woven and nonwoven, natural and synthetic fibers, and are available from many different commercial sources. In other embodiments, coverings are a layer(s) of organic or inorganic material, or a combination thereof, such as a polymer layer or a graphite layer.

The flame retardant coating or covering or combination thereof, is applied to at least one surface of a body of the invention utilizing one or more methods, including but not limited to, spray coating, roll coating, screen printing, bonding, adhesive, double sided tape or the like. Flame retardant coverings in one embodiment are applied utilizing an adhesive comprising a hot melt adhesive, an epoxy, a polyurethane, a phenolic resin or the like, with the adhesive disposed between the covering and body surface. Hot melt adhesives are preferred in one embodiment. In a preferred embodiment, a sheet of body material having a predetermined thickness is coated with the coating on at least one surface by roll coating, spraying or the like. Afterwards, a desired number of device bodies are formed from the coated sheet. In one embodiment, body is cut from the sheet, preferably with a die cutting apparatus, waterjet cutting apparatus, or cold laser as known in the art.

According to the invention, the purge system it is constructed so that it can withstand a temperature of at least 212° F. In further embodiments, the purge system can withstand a temperature of at least 350° F.

In a further embodiment of the invention, the purge system 10 is provided with a sensor 70, for example as shown in FIG. 6. The sensors of the present invention are suitable for measuring a desired property or condition adjacent an area of purge system 10, generally adjacent body 20. One or more, two or more, or even three or more, same or different, sensors can be operatively connected to body 20. Examples of suitable sensors include, but are not limited to, a pressure sensor, a pressure differential sensor, an impact measuring sensor, position sensor, force sensor, an imaging sensor, a temperature sensor, and a flow rate sensor. Various sensors and arrangements of sensor 20 are set forth in U.S. Pat. No. 9,133,727 herein incorporated by reference.

In one embodiment, the sensor 70 is located on a face of the body 20 adapted to be situated in the area to be purged as illustrated in FIG. 6. The sensor can include a wire, see for example connection 71, or a wireless connection to transmitter 72 that transmits the property or condition sensed by the sensor to a suitable output such as a display device for example as described in the above-identified patent.

For the avoidance of doubt, the purge system and devices of the present invention encompass all possible combinations of the components, including various ranges of said components, disclosed herein. It is further noted that the term 'comprising' does not exclude the presence of other elements. However, it is also to be understood that a description of a purge system comprising certain components also discloses a purge system consisting of these components. Similarly, it is also to be understood that a description of a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A purge system for welding applications, comprising:
a body having a three-dimensional shape, the body comprising one or more of a resilient and elastic material that allows the body to be compressed and re-expanded, the body having a length between a first end and second end, and a width perpendicular to the length, the body including pores such that an exhaust gas is able to travel in an indirect path through the body between the first end and the second end, wherein the body is free of a linear vent between the first end and the second end; and a purge valve system operatively connected to the body and including a purge valve having a first opening on the first end of the body and a second opening on the second end of the body for transporting a purging gas from the second end of the body to the first end, the purge valve having a fitting mateable with a fitting of a gas source; and a scaffold connected to both of the purge valve and the body that operatively connects the purge valve to the body wherein the scaffold includes at least two posts extending through the body between the first end and the second end, wherein a lower end of each of the at least two posts is integrally connected to a lower base, wherein the lower base has a flange that extends outwardly from each of the at least two posts in a direction substantially perpendicular to a longitudinal axis of each of the at least two posts, wherein the lower base includes a base aperture through which a portion of the purge valve system extends, wherein the scaffold includes an upper base connected to an upper end of each of the at least two posts, wherein the upper base includes an upper base flange and a cap having a cap aperture adapted for receiving a retrieval aid, wherein the upper base flange extends outwardly from the cap in a direction substantially perpendicular to a longitudinal axis of each of the at least two posts, and wherein the upper base includes a valve aperture through which a portion the purge valve system extends.

2. The purge system according to claim 1, wherein the purge valve protrudes outwardly a distance from the first end and the second end of the body.

3. The purge system according to claim 2, wherein the purge valve includes at least two connectable segments including an inlet segment comprising the fitting mateable with the fitting of the gas source and an outlet segment which includes the first opening.

4. The purge system according to claim 3, wherein the inlet segment and outlet segment are threadedly connected.

5. The purge system according to claim 3, wherein the purge valve is fixedly connected to at least one of the bases.

6. The purge system according to claim 3, wherein the inlet segment includes a threaded male section which is mateable with a female threaded section of the outlet segment.

7. The purge system according to claim 1, wherein the purge valve comprises a metal.

8. The purge system according to claim 7, wherein the purge valve comprises brass.

9. The purge system according to claim 1, wherein the fitting mateable with a fitting of the gas source comprises threads.

10. The purge system according to claim 1, wherein the purge valve is fixed in relation to the scaffold.

11. The purge system according to claim 1, wherein the body comprises open cell foam.

12. The purge system according to claim 11, wherein the body comprises less than or equal to 350 ppm of a halogen.

13. The purge system according to claim 12, wherein one or more of the first end and the second end of the body include a flame resistant or retardant coating or covering, wherein the coating is porous such that the gas is able to travel through the coating, and wherein the body is flame retardant.

14. The purge system according to claim 13, wherein the purge system can withstand a temperature of at least 212° F.

15. The purge system according to claim 14, wherein the purge system can withstand a temperature of least 350° F.

16. A purge system for welding applications, comprising:
   a body having a three-dimensional shape, the body comprising one r more of a resilient and elastic material that allows the body to be compressed and re-expanded, the body having a length between a first end and second end, and a width perpendicular to the length, the body including pores such that an exhaust gas is able to travel in an indirect path through the body between the first end and the second end;
   a purge valve system operatively connected to the body and including a purge valve having a first opening on the first end of the body and a second opening on the second end of the body for transporting a purging gas from the second end of the body to the first end, the purge valve having a fitting mateable with a fitting of a gas source, the purge system further including a scaffold connected to both of the purge valve and the body that operatively connects the purge valve to the body; and
   wherein the scaffold includes a post extending through the body between the first end and the second end wherein bases are connected to opposite ends of the post, with the bases each comprising a flange for preventing the body from being removed from the first end of the post, wherein one of the bases includes a cap having an internal cavity in which a second end of the post is located, wherein a latch is present in the internal cavity of the cap that mates with a portion of the post and prevents the post from being withdrawn from the cap.

17. The purge system according to claim 16, wherein the cap includes an aperture that extends completely through the cap from a first side to a second side thereof.

18. The purge system according to claim 17, wherein the purge dam further includes a lanyard operatively connected to the body and capable of being utilized to withdraw the purge system from a construction in which the purge dam is placed.

19. The purge system according to claim 18, wherein the purge dam further includes a sensor operatively connected to the body and capable of measuring a property adjacent to the body, and wherein the lanyard is able to transmit the property sensed by the sensor to a display device.

* * * * *

UNITED STATES PATENT AND TRADEMARK OFFICE
CERTIFICATE OF CORRECTION

PATENT NO. : 11,684,993 B2
APPLICATION NO. : 16/891304
DATED : June 27, 2023
INVENTOR(S) : Thomas J. Nolfi et al.

It is certified that error appears in the above-identified patent and that said Letters Patent is hereby corrected as shown below:

In the Claims

In Claim 16, Line 3, delete "r" and replace it with --or--.

Signed and Sealed this
Twelfth Day of September, 2023

Katherine Kelly Vidal
*Director of the United States Patent and Trademark Office*